Patented May 20, 1924.

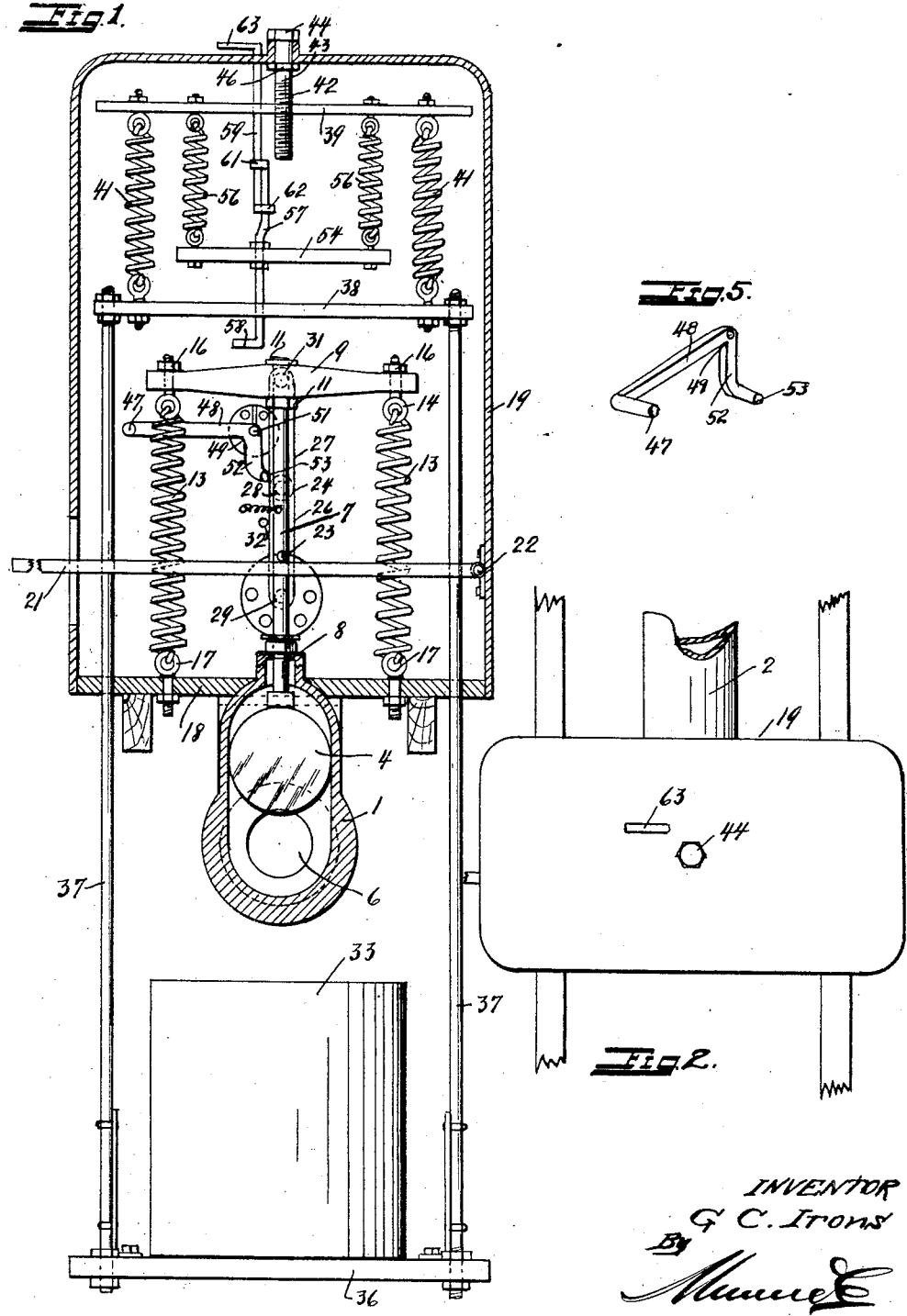

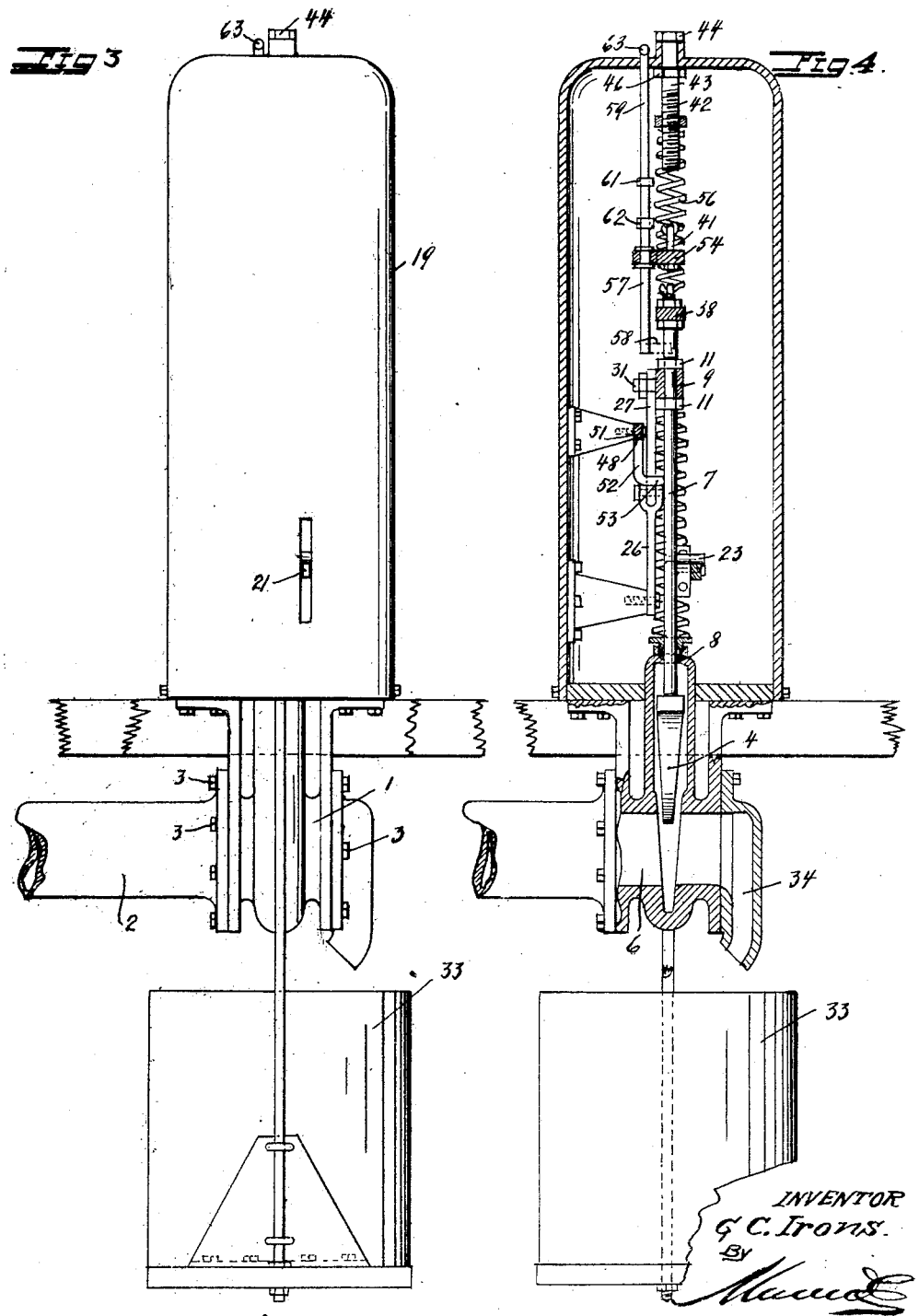

1,494,746

UNITED STATES PATENT OFFICE.

GEORGE C. IRONS, OF LOST HILLS, CALIFORNIA.

AUTOMATIC VALVE CONTROL.

Application filed November 27, 1922. Serial No. 603,711.

*To all whom it may concern:*

Be it known that I, GEORGE C. IRONS, a citizen of the United States, and a resident of Lost Hills, county of Kern, State of California, have invented a new and useful Automatic Valve Control, of which the following is a specification.

The present invention relates to valves and has particular reference to automatic means for closing a valve whenever a predetermined quantity of liquid has passed the same. This valve is particularly designed for the purpose of allowing the operator to measure the quantity of liquid passed through the valve and is a part of a larger machine which provides also means for automatically opening the valve at predetermined times and under predetermined conditions. The latter device however will not be described in the present application and it will be assumed for the purpose of this description that the opening of the valve is accomplished at the proper time and under the proper conditions by hand or in any other suitable manner. As far as the valve closing arrangement is concerned which forms the object of the present invention it is proposed to use the weight of the liquid that has passed through the valve as an actuating means for closing the same. Further objects and advantages of the device will appear as the specification proceeds.

The preferred form of the present invention is illustrated in the accompanying drawings in which Figure 1 shows a vertical section through my device, Figure 2 a top plan view of the same, Figure 3 a side elevation, Figure 4 a vertical section taken at right angles to that of Figure 1 and Figure 5 a perspective detail view of a lever used in my device. While I have shown only the preferred form of the invention it should be understood that various changes or modifications may be made within the scope of the claims hereto attached without departing from the spirit of the invention.

The valve housing (1) introduced in the pipe (2) in any suitable manner as by the bolts (3) has a sliding gate valve (4) disposed therein adapted to close the port (6) in the valve housing when slid downwardly and to open the same when lifted into the position shown in Figure 1. A vertical rod (7) connected with its lower end to the gate valve (4) extends through the valve housing as shown at (8) and is provided at its top end with a cross bar (9) supported between the two nuts (11). The ends of the cross bar have springs (13) secured thereto by means of hooks (14) fastened by the nuts (16). The lower ends of the springs (13) engage through the hooks (17) the bottom (18) of a larger housing (19) fixed to the valve housing, the springs (13) tending to pull the cross member (9) downwardly and to thereby close the valve.

As previously stated the valve is opened automatically in the complete machine of which this valve forms a part but since my description is confined to the closing feature it may suffice to say that the valve may be opened by means of the lever (21) pivotally secured in the wall of the housing (19) as shown at (22) and engaging with its central portion a stud (23) extending from the rod (7). When the lever (21) is lifted by manual or other means the stud (23) is engaged by the same whereby the rod is lifted and the valve opened.

To hold the valve open until a predetermined quantity of liquid has passed the same I provide a locking means for holding the rod in its uppermost position comprising an elbow joint (24) consisting of two links (26) and (27) pivoted together as shown at (28), the free end of the lower link (26) being pivotally secured to the housing (19) as shown at (29) while the free end of the upper link (27) is pivotally secured to the rod or the cross beam (9) as shown at (31). The links are proportioned to straighten the elbow when the rod (7) is in its uppermost position, at which time the valve is opened. A stop (32) is provided on one side of the elbow joint to prevent the same from going beyond the locking position.

It will be readily seen that as long as the elbow joint is straight as shown in Figure 1 the springs (13) are unable to close the valve, which latter function cannot be performed until the obstacle offered by the elbow joint has been eliminated. The object of the present invention being to allow the valve to be closed whenever a certain quantity of liquid has passed through the same I provide a vessel (33) beneath the valve into which the liquid is discharged through the port (34). This vessel is supported on a platform (36) connected through vertical rods (37) with a horizontal beam (38) within the housing (19) which latter is suspended from a supporting beam (39) by means of springs (41). The supporting member (39) is engaged by the threaded end (42) of a bolt (43) extending through the top of the housing (19) and held against longitudinal motion by its head (44) and a collar (46) on opposite sides of the top of the housing. The supporting beam member (39) therefore may be lowered or raised relative to the top of the housing by turning the bolt (43).

When the vessel (33) is empty the springs (41) are able to hold the beam (38) on which the platform (36) carrying the vessel (33) is supported in the position shown in Figure 1. As the weight of the vessel increases due to the increasing quantity of liquid collected in the same the beam (38) is pulled downward gradually until when a predetermined weight is obtained it strikes a horizontal extension (47) of the arm (48) of a bell crank lever (49) pivoted to the housing (19) as shown at (51). The second arm (52) of the bell crank lever extends downwardly and is provided with a horizontal extension (53) disposed in the immediate proximity of the elbow joint (24). When the extension (47) of the lever arm (48) is pressed downwardly by the descending beam (38) the extension (53) of the lever arm (52) bears against the elbow joint and bends the same thereby eliminating its locking character and enabling the springs (13) to pull the cross member (9) downwardly and to thereby close the valve.

The operation of the device thus far described is as follows—to open the valve the lever (21) is lifted to engage the stud (23) and to raise the rod (7) whereby at the same time the elbow joint (24) is straightened so as to lock the rod in its valve opening position. The liquid is now allowed to pass through the valve into the vessel (33). As the weight of the latter increases it pulls the beam (38) downwardly which latter at a predetermined time strikes the extension (47) of the lever arm (48) and causes the extension (53) of the other lever arm to bend the elbow joint whereupon the springs (13) are allowed to close the valve.

In case it is desired that the vessel should hold a larger quantity of liquid before it operates the lever (49) I provide an additional spring support for the beam (38) consisting of a second beam (54) suspended from the supporting member (39) by means of springs (56). The second beam (54) holds a vertical rod (57) against longitudinal motion and a horizontal extension (58) of the same is adapted to be turned so as to lie underneath the beam (38) and to assist in supporting the same. The vertical rod (57) is preferably handled from the outside of the housing (19) by means of a second rod (59) slidably engaging the same by means of two hooks (61) and (62) and provided with a handle (63). In the position shown in Figure 1 this auxiliary supporting means for the beam (38) is inactive but if turned through a quarter of a turn the horizontal extension (58) engages the underside of the beam (38) during the descent of the latter and then assists in supporting the vessel so that the latter will descend to the point where it strikes the extension (47) of the bell crank lever (49) whenever a larger quantity of liquid is discharged into the same than was necessary in the prior case.

I claim:

1. An automatic valve closing device comprising a vessel, a liquid carrying medium discharging into the same, a vertically sliding valve in said medium having spring means associated therewith tending to seat the same, means for lifting the valve having an elbow joint associated therewith adapted to straighten when the valve is lifted so as to lock the latter in its open position, and means actuated by the increasing weight of the vessel adapted to bend the elbow joint whereby the valve is allowed to close, comprising a lever mounted in operative proximity to the elbow joint and a yielding support for the vessel causing the lever to strike the elbow joint when the vessel is lowered beyond a predetermined point.

2. A valve control comprising a valve housing, a valve slidable therein, having a valve stem extending through the housing, a cross member on the stem, spring means engaging the cross-member tending to close the valve, means for lifting the stem whereby the valve is opened and means for locking the valve in its open position comprising an elbow joint supported between the stem and a stationary point adapted to straighten when the valve is lifted.

3. A valve control comprising a valve housing, a valve slidable therein, having a valve stem extending through the housing, a cross-member on the stem, spring means engaging the cross-member tending to close the valve, means for lifting the stem whereby the valve is opened, means for locking the valve in its open position comprising an elbow joint adapted to straighten when the valve is lifted and a lever mounted in operative proximity to the elbow joint adapted to strike the elbow joint under predetermined conditions.

4. In a device of the character described, a spring-supported control-element having additional spring means associated therewith adapted to be rendered operative at the option of the operator comprising a vertical member terminating in a horizontal arm adapted to engage the element when revolved through a fraction of a turn and spring means for supporting the vertical member.

GEORGE C. IRONS.